(12) United States Patent
Scheer

(10) Patent No.: US 6,889,248 B1
(45) Date of Patent: May 3, 2005

(54) AUTOMATICALLY CONFIGURING A SERVER INTO A MASTER OR SLAVE SERVER BASED ON ITS RELATIVE POSITION IN A SERVER NETWORK

(75) Inventor: Lyle Scheer, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/547,699

(22) Filed: Apr. 12, 2000

(51) Int. Cl.[7] ............................................. G06F 15/16
(52) U.S. Cl. ...................... 709/209; 709/220; 370/216; 370/438
(58) Field of Search ............................... 700/90, 95–96, 700/115–116; 710/100, 107, 110, 104; 709/200, 208–209, 210; 379/142.12, 111; 340/825, 2.26, 2.24, 2.21, 2.2, 2.1; 713/1, 100

(56) References Cited

U.S. PATENT DOCUMENTS 5,914,957 A * 6/1999 Dean et al. ................. 370/438
6,104,716 A * 8/2000 Crichton et al. ............ 370/401
6,160,810 A * 12/2000 Brodigan ................ 370/395.52
6,348,933 B1 * 2/2002 Walls et al. ................. 345/744
6,434,113 B1 * 8/2002 Gubbi ......................... 370/216
6,510,350 B1 * 1/2003 Steen et al. ..................... 700/9
2001/0007086 A1 * 7/2001 Rogers et al. ................ 701/33
2002/0052935 A1 * 5/2002 Paxhia et al. ............... 709/220

* cited by examiner

Primary Examiner—Wen-Tai Lin
(74) Attorney, Agent, or Firm—Blakely, Sokoloff, Taylor & Zafman LLP

(57) ABSTRACT

A server network is described. In one embodiment, the server network comprises a global master server, a local master server and one or more slave servers. The local master server is coupled to the central master server via a first network and is synchronized to the global master server. The one or more slave servers are coupled to the local master server via a second network to perform manufacturing tasks to facilitate building products. The global master, local master and slave servers are programmed the same and configurable to different tasks, including automatically configurable as a master or server based on the interface of the server to which they are coupled.

10 Claims, 1 Drawing Sheet

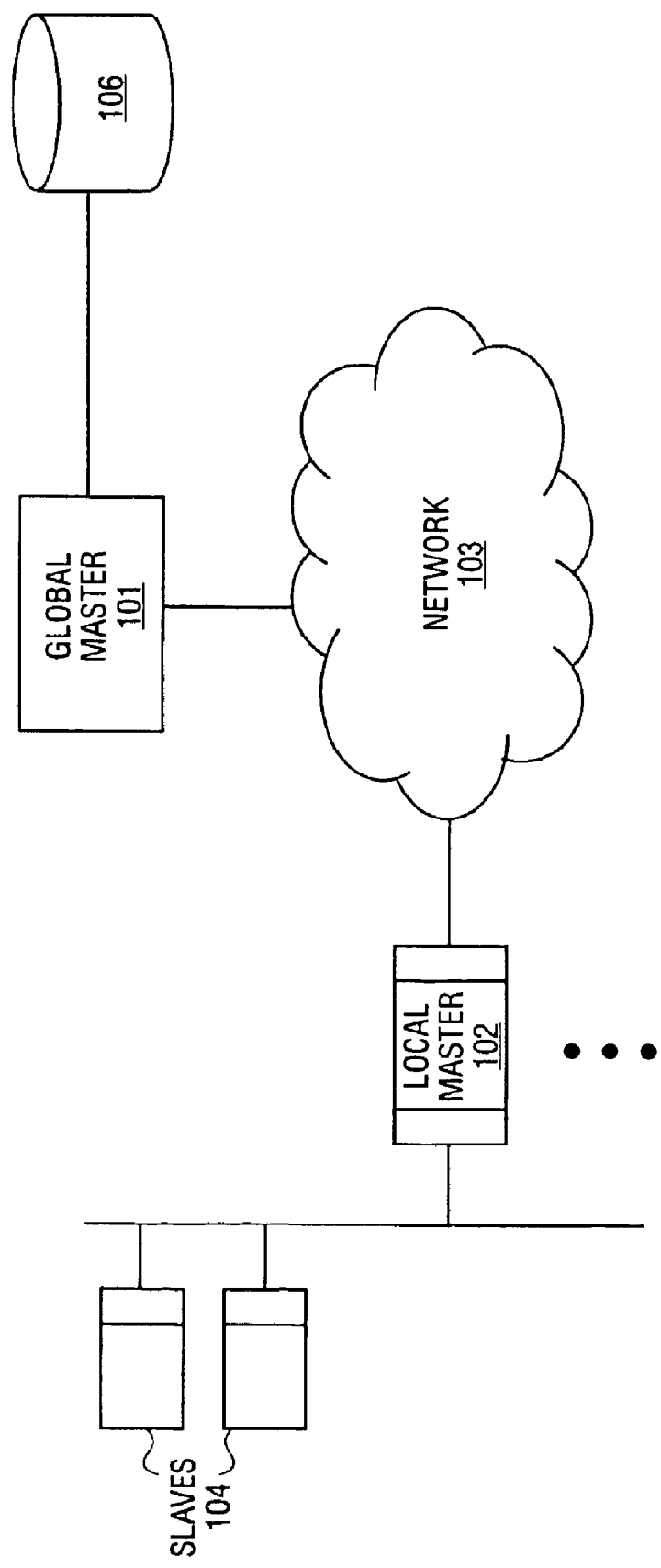

AUTOMATICALLY CONFIGURING A SERVER INTO A MASTER OR SLAVE SERVER BASED ON ITS RELATIVE POSITION IN A SERVER NETWORK

FIELD OF THE INVENTION

The present invention relates to the field of server networks; more particularly, the present invention relates to server networks that operates using computer controlled processes.

BACKGROUND OF THE INVENTION

Today, factories manufacturing processes are often controlled by the use of computers or servers or other computer systems. The cost of setting up these manufacturing facilities is often very expensive. One of the problems is that each server or computer system must be configured specifically to perform one or more functions. This requires that each system be programmed individually to perform its desired task. Programming each machine separately adds additional cost and manpower, thereby increasing overall costs.

Servers in the manufacturing facilities typically are controlled by a central system. If communication is interrupted between the control system on the remaining subsystems, factory operations may cease.

SUMMARY OF THE INVENTION

A server network is described. In one embodiment, the server network comprises a global master server, a local master server and one or more slave servers. The local master server is coupled to the central master server via a first network and is synchronized to the global master server. The one or more slave servers are coupled to the local master server via a second network to perform manufacturing tasks to facilitate building products. The global master, local master and slave servers are programmed the same and configurable to different tasks, including automatically configurable as a master or server based on the interface of the server to which they are coupled.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates a block diagram of one embodiment of a server network.

DETAILED DESCRIPTION OF THE PRESENT INVENTION

A server network is described. In the following description, numerous details are set forth, such as distances between components, types of molding, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

A Server Network

FIG. 1 illustrates a server network. Referring to FIG. 1, a global master server 101 is coupled to local master server 102 via network 103. In one embodiment, global master server 101 is located at a central location or at a headquarters, while local master 102 is located in a remote location, such as a factory. Network 103 may comprise the internet, a physical private network, a virtual private network, or any other suitable network infrastructure. In one embodiment, the communication between global master server 101 and local master server 102 is secure. Such security may be obtained by utilizing a standard secure protocol, such as, for example, SSH, over the internet.

In one embodiment, the slaves 104 and local master 102 are at a manufacturing site such that there are multiple slave servers on a single master at the manufacturing site. Each slave has the same basic information as the master but may be configured to a specific different function but may be configured to a specific different function at the factory. This allows a factory to be set up in which all the servers, such as slaves 104 and local master server 102, to include the same information yet be configured for different functions. Such functions may include building components, boards, servers or other systems, etc.

Also coupled to local master 102 is one or more slaves 104 via local area network (LAN) 105.

Database 106 is coupled to global master server 101. Database 106 includes the software that allows each of slaves 104 to be configured to build the different product as well as to have the software necessary for allowing server to be a global master server or a local master server. In one embodiment, database 106 has a description of the binaries for software that is placed on local master server 102 and slaves 104. In one embodiment, there are numerous descriptions of how a system is built and tested and such software is loaded by the global server 101 onto local server 102. Global master server 101 and database 106 operate in conjunction to synchronize the software on a local master server 102. By allowing the global master server 101, in conjunction with database 106, to configure other servers, the global master server 101 is able to replicate itself.

In order to set up a factory, local master server 102 is configured by global master 101. In one embodiment, the configuration of local master 102 by global master server 101 is performed by connecting local master server 102 to global master server 101 at the central or headquarters site. At that time, the software stored in database 106 is downloaded into local master server 102. Thus, local master server 102 is built off global master 101. Once the configuration has been completed, local master server 102 may be coupled to network 103 and set up in a remote location.

Each of the servers in the system has two interfaces, a primary interface and the secondary interface. When the primary interface of local master server 102 is connected to the network, local master server 102 automatically configures itself to communicate with the global master server 101. Thus, in this manner, local master server 102 automatically configures itself to operate as a slave with respect to the global master server 101.

In one embodiment, servers built on the global master server 101 automatically generate a key during the build process and their public key is placed on the global master server 101 allowing those servers access to the master server 101. This enables the use of public key encryption to allow for additional security when global master server 101 is communicating with local master server 102 over network 103. In one embodiment, an administrator may place the key on the master server 101 of a server not built on the global master server 101, thereby allowing such that server to gain access to the global master server 101. The local master server 102, as a slave, uses this key to synchronize itself with the master. If the master server 101 does not have the key, then no synchronization is possible. In one embodiment, the local server 102 contacts global master server 101 using an IP address for the global master server 101. If there is no global master during the bootup process, local master server 102 may take the role of global master server 101.

Similarly, slaves 104 automatically configure themselves to operate as slaves on the local area in network 105 due to their connection to the secondary interface of local master server 102 via LAN 105. In one embodiment, the connection to LAN 105 is through an ethernet connection. Thus, local master server 102 synchronizes to the single global master server 101 and a slave, such as slaves 104, as connected to a secondary ethernet connection of a master, such as local master server 102, synchronizes to that master. In this manner, a hierarchical chain of servers may be configured and created.

During the configuration of slaves 104, each of such slaves sends a packet at bootup to the local master 102. In response to that packet, local master server 102 sends a reply that indicates what function the slave is to perform. Using this information, slaves 104 configure themselves to perform that function. In one embodiment, there are multiple types of slaves that may be deployed. For example, one or more slaves may perform a board test in the factory. In another embodiment, one or more servers may perform a system build test, a run-in (burn in), etc.

In one embodiment, subsequent to system configuration, the local master resynchronizes itself with the global master server 101. Similarly, slaves 104 resynchronize themselves with the local master server 102. During such synchronization, data relating to the units currently being built is gathered on a database of the local master server 102 and synchronized with the global master database 106. Data describing how a system is built and tested, is loaded on the global master and synchronized to local masters, such as local master server 102, once a day. In one embodiment, a mirroring tool such as Rsync performs mirroring by checking binaries on both servers and provides a compressed version of the difference in order to update the server for synchronization.

In one embodiment, systems that are built by the build to order server network are issued with a revision code. In one embodiment, if there has been an update to the software, a code associated with the latest version of the software is compared to the revision code on the product (e.g., server). If the revision codes don't match, then the product is not permitted to be released.

It should be noted that the servers in the system can also run stand alone without a connection to the Internet and, thus, are fault tolerant to network problems. In other words, if the connection between local master 102 to network 103 is down, the factory can essentially run autonomously. This is the case even though local master server 102 and global master server 101 operate in synch with each other. That is, although local master 102 and global master server 101 may subsequently operate asynchronously, the factory or service center is able to continue operating autonomously. Therefore, such autonomous operation provides for fault tolerance and also reduces the load on the global master server 101.

Similarly, if the local master 102 becomes inoperable, the slaves 104 can still perform their function, and can run autonomously. Also note that a server can be used to build another server, and therefore, if local master 102 or slaves 104 becomes inoperable, another can be created.

Moreover, the replication ability of the servers allows for numerous servers to be created to perform a specific function and switch in or out depending on their operability. Switching in and out of such servers may be transparent. In one embodiment, a PC monitors all the slaves and determines when a slave becomes inoperable. At such time, reboot operation is performed to allow a replacement server to take over the function of the inoperable server.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A server network comprising:

a global master server;

a local master server coupled to the global master server via a first network and synchronized thereto, wherein the local master server is automatically configurable as a slave server with respect to the global master server based on an interface between the local master server and the global master server; and one or more slave servers coupled to the local master server via a second network to perform manufacturing tasks to facilitate building products, the global master, local master, and slave servers being programmed the same, the one or more slave servers automatically configurable as one or more slave servers with respect to the local master server based on an interface between the local master server and each of the one or more slave servers, and the local master server being automatically configurable as a master server with respect to the one or more slave servers based on the interface between the local master server and each of the one or more slave servers, wherein the interface is for signaling to each associated server of its relative position in the network without further signaling for server configuration.

2. The server network defined in claim 1, wherein one of the global master, local master, and slave servers is operable to program another server.

3. The server network defined in claim 1 wherein communication over the first network is secure.

4. The server network defined in claim 1 wherein communication over the first network is encrypted.

5. The server network defined in claim 1, wherein communication over the first network is secured via Secure Shell (SSH).

6. The server network defined in claim 1, further comprising a plurality of local master servers coupled to the global master server via the first network, wherein each of the plurality of local master servers operates with respect to the global master server asynchronously when communication via the first network is unavailable and synchronously when communication via the first network is available.

7. The server network defined in claim 1 wherein the first network comprises an Internet.

8. The server network defined in claim 1 wherein the first network comprises a virtual private network.

9. The server network defined in claim 1 wherein the first network comprises a physical private network.

10. The server network defined in claim 1 wherein the second network comprises a local area network (LAN).

* * * * *